(12) United States Patent
Liu

(10) Patent No.: US 9,849,584 B1
(45) Date of Patent: Dec. 26, 2017

(54) TOOL CABINET

(71) Applicant: Chia-Ming Liu, Douliou (TW)

(72) Inventor: Chia-Ming Liu, Douliou (TW)

( * ) Notice: Subject to any disclaimer, the term of this patent is extended or adjusted under 35 U.S.C. 154(b) by 0 days.

(21) Appl. No.: 15/604,103

(22) Filed: May 24, 2017

(30) Foreign Application Priority Data

Jan. 24, 2017 (CN) .................... 2017 2 0104313 U

(51) Int. Cl.
*A47B 9/00* (2006.01)
*B25H 3/02* (2006.01)
*B23Q 9/00* (2006.01)
*H02J 7/00* (2006.01)
*A47B 83/00* (2006.01)
*A47B 9/20* (2006.01)

(52) U.S. Cl.
CPC ............ B25H 3/027 (2013.01); B23Q 9/005 (2013.01); H02J 7/0055 (2013.01); *A47B 9/20* (2013.01); *A47B 83/00* (2013.01); *B23Q 9/0014* (2013.01); *B25H 3/02* (2013.01); *H02J 7/0052* (2013.01)

(58) Field of Classification Search
CPC .......... B25H 3/028; B25H 3/027; B25H 3/02; B25H 3/023; B23Q 9/005; B23Q 9/0014; H02J 7/0055; A47B 83/00; A47B 9/04; A47B 9/20
See application file for complete search history.

(56) References Cited

U.S. PATENT DOCUMENTS

| 6,213,575 | B1 * | 4/2001 | Brin, Jr. ................. | A47B 77/04 108/147 |
| 6,595,144 | B1 * | 7/2003 | Doyle ...................... | A47B 9/00 108/147 |
| 8,033,620 | B2 * | 10/2011 | Retchloff ................. | B25H 3/04 312/290 |
| 9,486,911 | B1 * | 11/2016 | Liu .......................... | B25H 1/12 |
| 2012/0248910 | A1 * | 10/2012 | Randlov .................. | A47B 9/04 310/83 |
| 2016/0198852 | A1 * | 7/2016 | Liu .......................... | A47B 9/04 312/317.3 |
| 2016/0198853 | A1 * | 7/2016 | Liu .......................... | A47B 83/00 312/317.3 |

* cited by examiner

*Primary Examiner* — Daniel J Rohrhoff
(74) *Attorney, Agent, or Firm* — Trop Pruner & Hu, P.C.

(57) ABSTRACT

A tool cabinet includes a cabinet body having two guide rails and a routing space that is proximate to one of the guide rails, a working platform unit having a protective tube, two lifting units, a driving unit, and a power supply unit having a transmission wire. The working platform unit includes two extension members respectively slidable relative to the guide rails. Each lifting units includes a threaded rod extending through a respective extension member. The driving unit is disposed for driving rotation of the threaded rod of a respective one of the lifting units. The transmission wire has an end connected to the driving unit, and an opposite end extending through the protective tube into the routing space.

10 Claims, 10 Drawing Sheets

TOOL CABINET

CROSS-REFERENCE TO RELATED APPLICATION

This application claims priority to Chinese Patent Application No. 201720104313.0, filed on Jan. 24, 2017.

FIELD

The disclosure relates to a tool cabinet, and more particularly to a tool cabinet that has a height-adjustable working platform.

BACKGROUND

Referring to FIG. 1, a conventional tool cabinet as disclosed in Chinese Patent No. 204868803U includes a cabinet body 1, a working platform unit 2 disposed on the cabinet body 1, two lifting units 3 respectively disposed at opposite sides of the cabinet body 1 and connected to the working platform unit 2, a linkage unit 4 interconnecting the lifting units 3, and a driving unit 5 disposed on the working platform unit 2. The cabinet body 1 includes two slide rails 101. The working platform unit 2 has two extension members 201 respectively and slidably inserted into the slide rails 101. Each of the lifting units 3 has a guide tube 301, a nut 302 that is disposed on a top end of the guide tube 301, a threaded rod 303 that is rotatably connected to the working platform unit 2, and that is threadedly connected to the nut 302, and a transmission bevel gear 304 that is disposed on a top end of the threaded rod 303. The linkage unit 4 includes a linkage rod 401, and two linkage bevel gears 402 that are respectively connected to opposite ends of the linkage rod 401, and that respectively mesh with the transmission bevel gears 304 of the lifting units 3. The driving unit 5 includes a motor 501, a drive bevel gear 502 that is connected to the motor 501, and that meshes with the transmission bevel gear 304 of one of the lifting units 3, and a transmission wire 503 that is electrically connected to the motor 501.

When lifting or lowering the working platform unit 2, a user needs to start the motor 501 to drive rotation of the threaded rod 303 of the one of the lifting units 3 via the engagement between the drive bevel gear 502 and the transmission bevel gear 304 of the one of the lifting units 3. During the abovementioned rotation of the threaded rod 303, the transmission bevel gear 304 of the one of the lifting units 3 simultaneously drives rotation of the linkage rod 401 via the engagement between the transmission bevel gear 304 of the one of the lifting units 3 and a corresponding one of the linkage bevel gears 402, thereby driving rotation of the threaded rod 303 of the other one of the lifting units 3 (not shown in FIG. 1) via the engagement between the other one of the linkage bevel gears 402 and the transmission bevel gear 304 of the other one of the lifting units 3 (not shown in FIG. 1). For each lifting unit 3, since the rotation of the threaded rod 303 results in telescopic movement of the threaded rod 303 relative to the guide tube 301 via the engagement between the threaded rod 303 and the nut 302, the working platform unit 2 can eventually be moved upwardly and downwardly along the slide rails 101.

However, when in use, unlike the threaded rod 303 of the one of the lifting units 3, rotation of the threaded rod 303 of the other one of the lifting units 3 is driven via the linkage unit 4 instead of being directly driven by the driving unit 5, so that a delayed rotation of the threaded rod 303 of the other one of the lifting units 3 may occur (i.e., rotations of the threaded rods 303 of the lifting units 3 are not synchronous with each other), which results in twisting of the linkage rod 401 and unsmooth movement of the working platform unit 2. In addition, the drawback of asynchronous rotation of the threaded rods 303 will be much more apparent as the linkage rod 401 becomes longer.

Furthermore, since the transmission wire 503 is hung below the working platform member 2 without being shielded, the user may easily be distracted by or even be entangled by the transmission wire 503 during operation of the working platform unit 2.

SUMMARY

Therefore, an object of the disclosure is to provide a tool cabinet that can alleviate at least one of the drawbacks of the prior art.

According to the disclosure, the tool cabinet includes a cabinet body, a plurality of drawers, a working platform unit, two lifting units, a driving unit, and a power supply unit. The cabinet body includes a top wall formed with a guide hole, and two spaced-apart guide rails respectively disposed proximate to opposite ends of the top wall and extending in a vertical direction. The cabinet body defines a routing space that is proximate to one of the guide rails, and that is in communication with the guide hole. The drawers are movably disposed in the cabinet body, and are disposed under the top wall. The working platform unit includes a platform member disposed above the top wall, two hollow extension members, and a protective tube. The extension members are respectively disposed on opposite ends of the platform member, and are connected respectively to the guide rails. Each of the extension members is slidable relative to a respective one of the guide rails. The protective tube extends downwardly from the platform member in the vertical direction through the guide hole, and has a bottom end portion. The working platform unit is movable relative to the cabinet body between a lowered position, where the platform member is proximate to the top wall and where the bottom end portion of the protective tube is distal from the top wall, and a lifted position, where the platform member is distal from the top wall and where the bottom end portion of the protective tube is proximate to the top wall. Each of the lifting units includes a guide tube, a nut, and a threaded rod. The guide tube is disposed on the cabinet body and extends in a respective one of the guide rails. The nut is disposed fixedly on a top end of the guide tube. The threaded rod is connected rotatably to the working platform unit, extends through a respective one of the extension members, and is threadedly connected to the nut. The driving unit is disposed on the working platform unit for driving rotation of the threaded rod of a respective one of the lifting units relative to the nut of the respective one of the lifting units, thereby driving the movement of the working platform unit between the lowered and lifted positions. The power supply unit includes a power supply module disposed on the cabinet body, and a transmission wire having an end that is electrically connected to the driving unit, and an opposite end that extends through the protective tube into the routing space and that is electrically connected to the power supply module.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
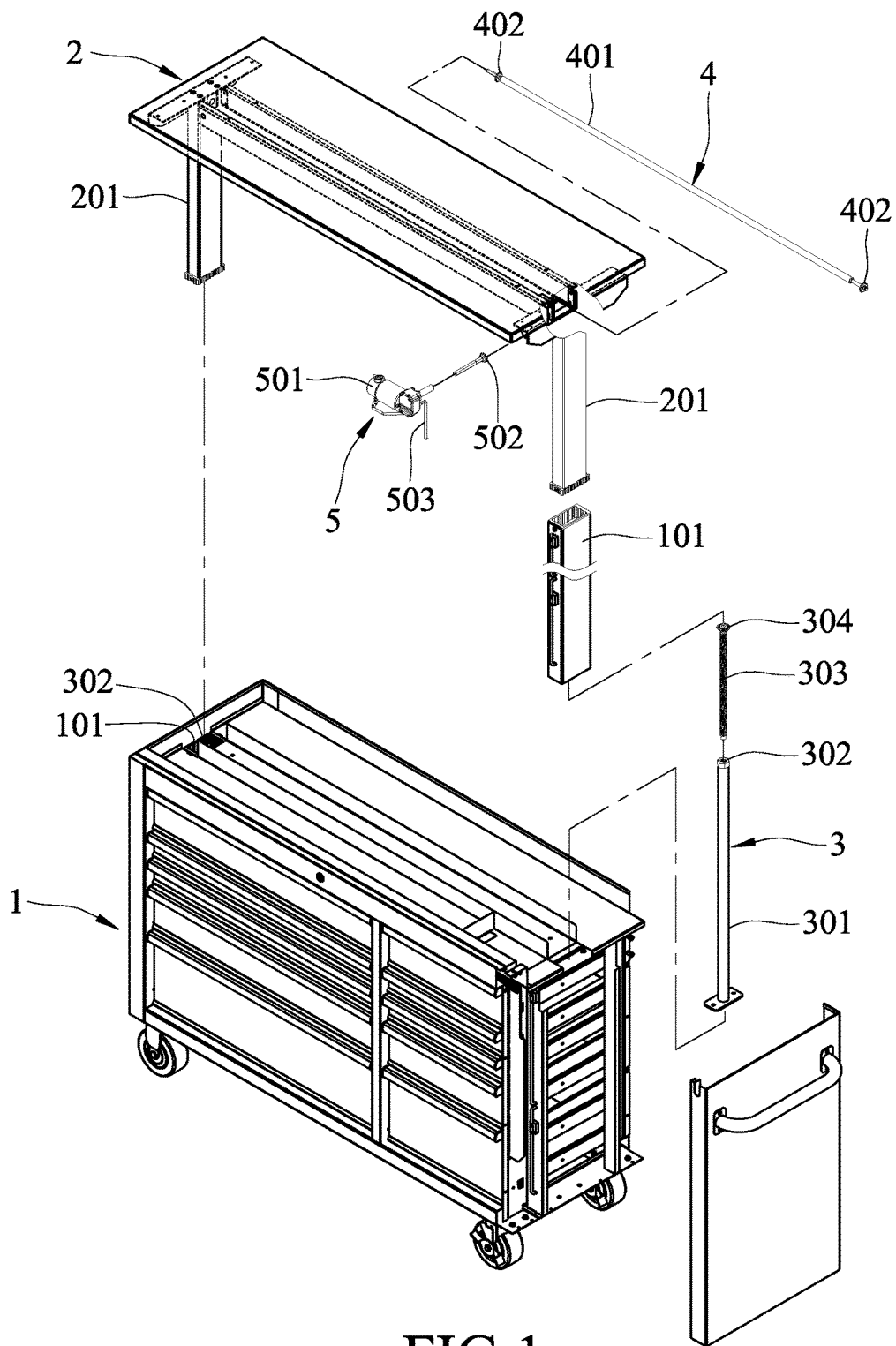
FIG. 1 is a fragmentary and partly exploded perspective view of a conventional tool cabinet.
Figure 2:
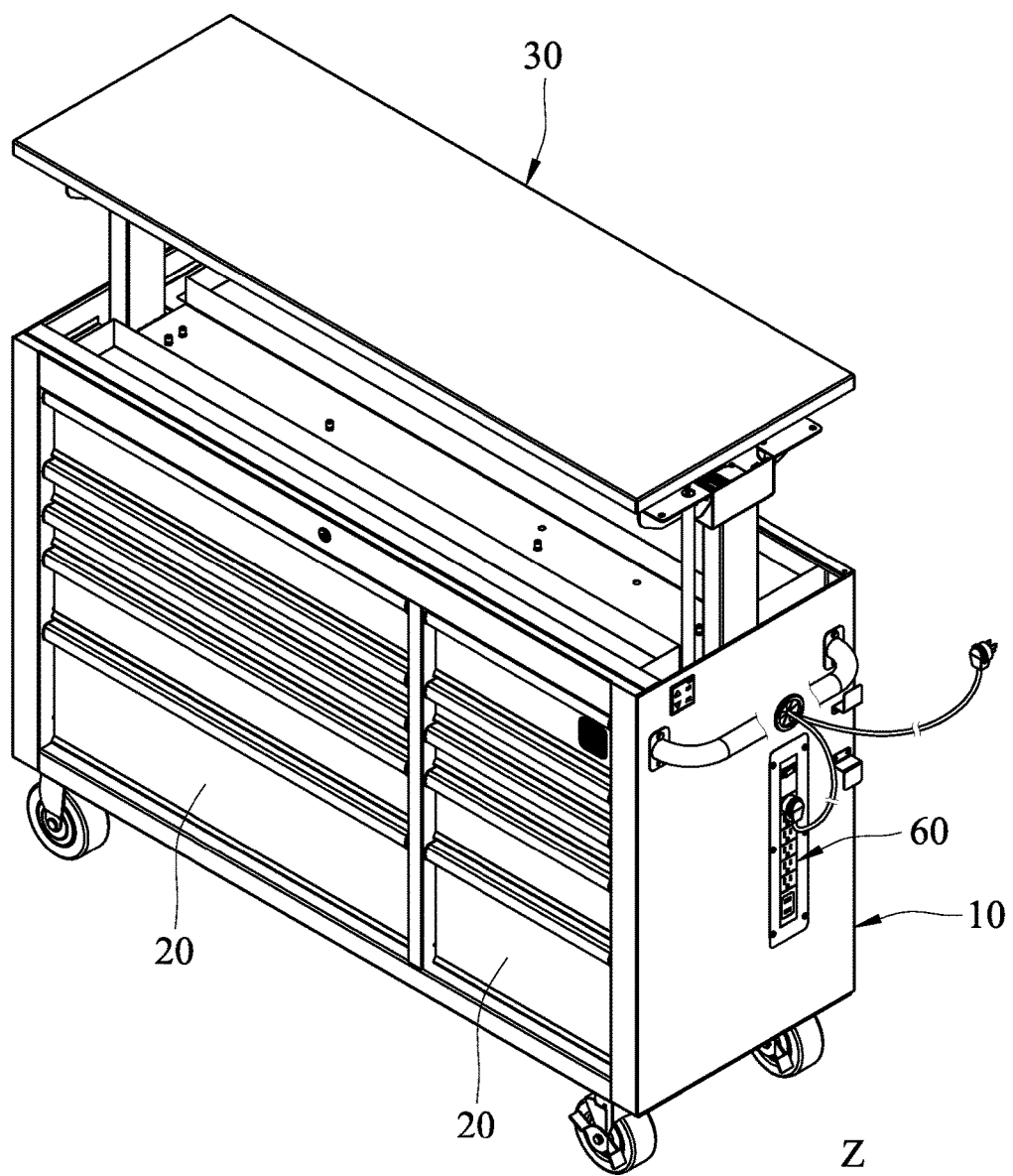
FIG. 2 is a perspective view of an embodiment of a tool cabinet according to the disclosure.
Figure 3:
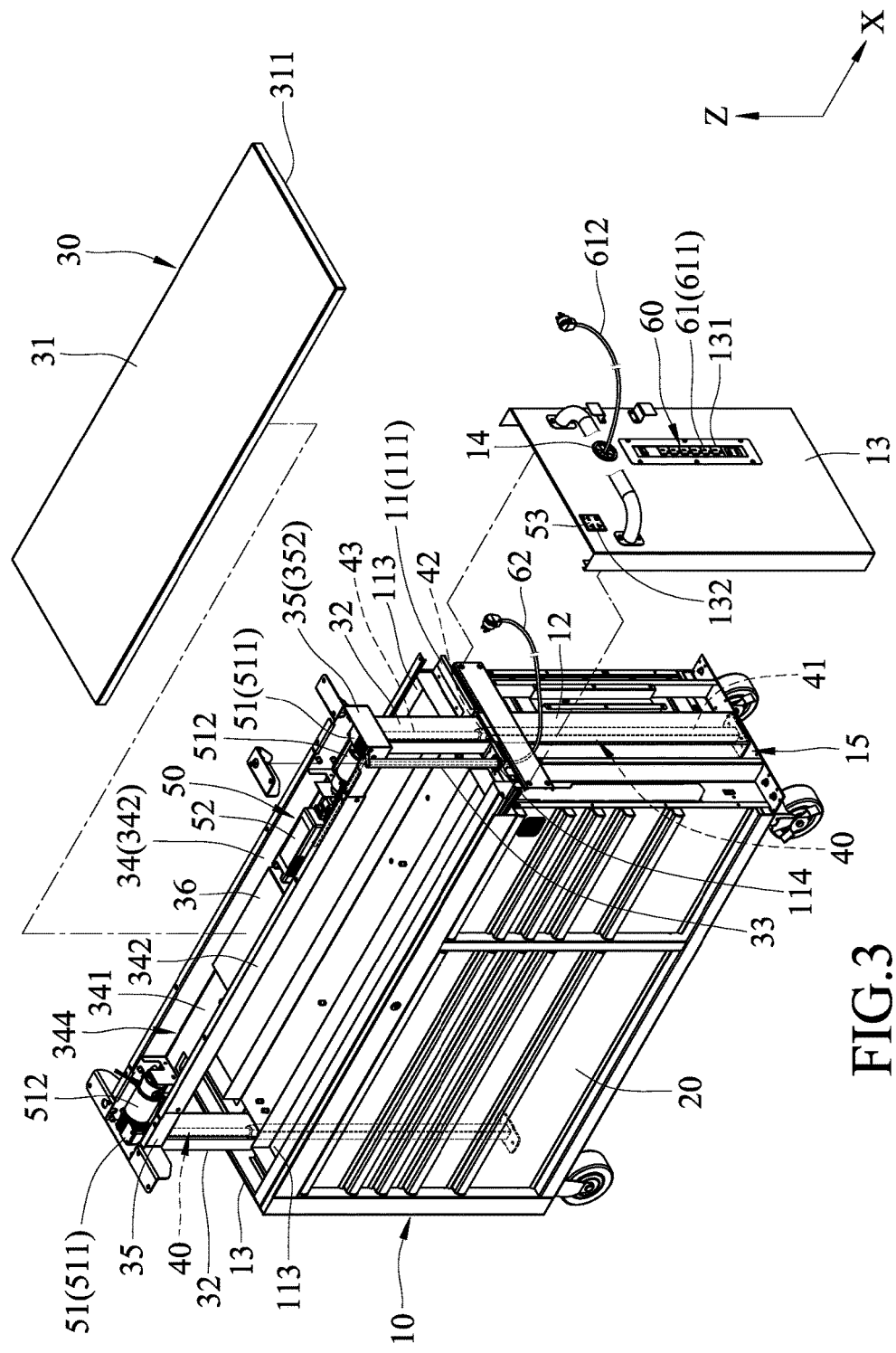
FIG. 3 is a partly exploded perspective view of the embodiment.

Referring to FIGS. 2 and 3, an embodiment of a tool cabinet according to the disclosure includes a cabinet body 10, a plurality of drawers 20, a working platform unit 30, tow lifting units 40, a driving unit 50, and a power supply unit 60.

Figure 4:
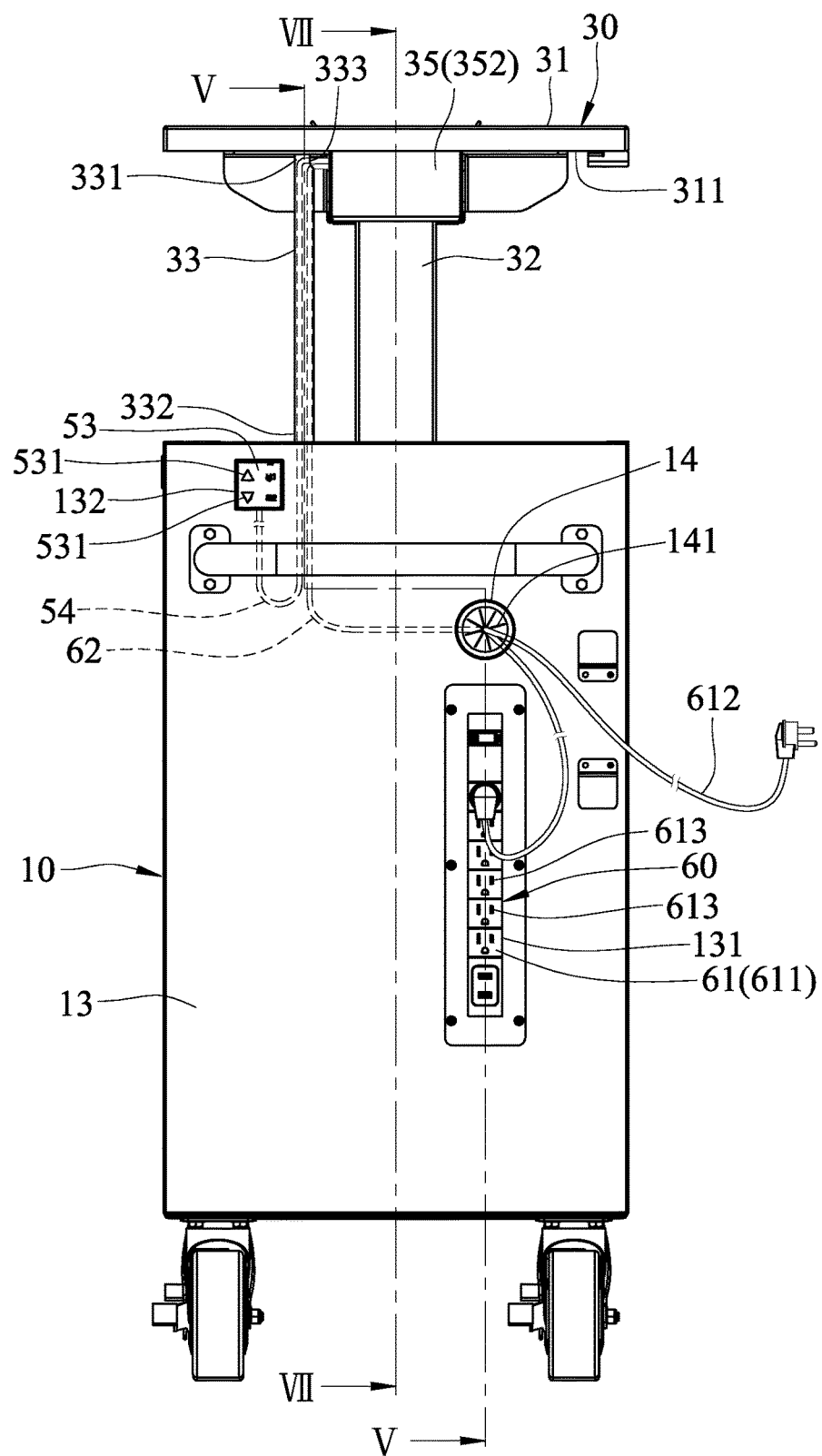
FIG. 4 is a side view of the embodiment.
Figure 5:
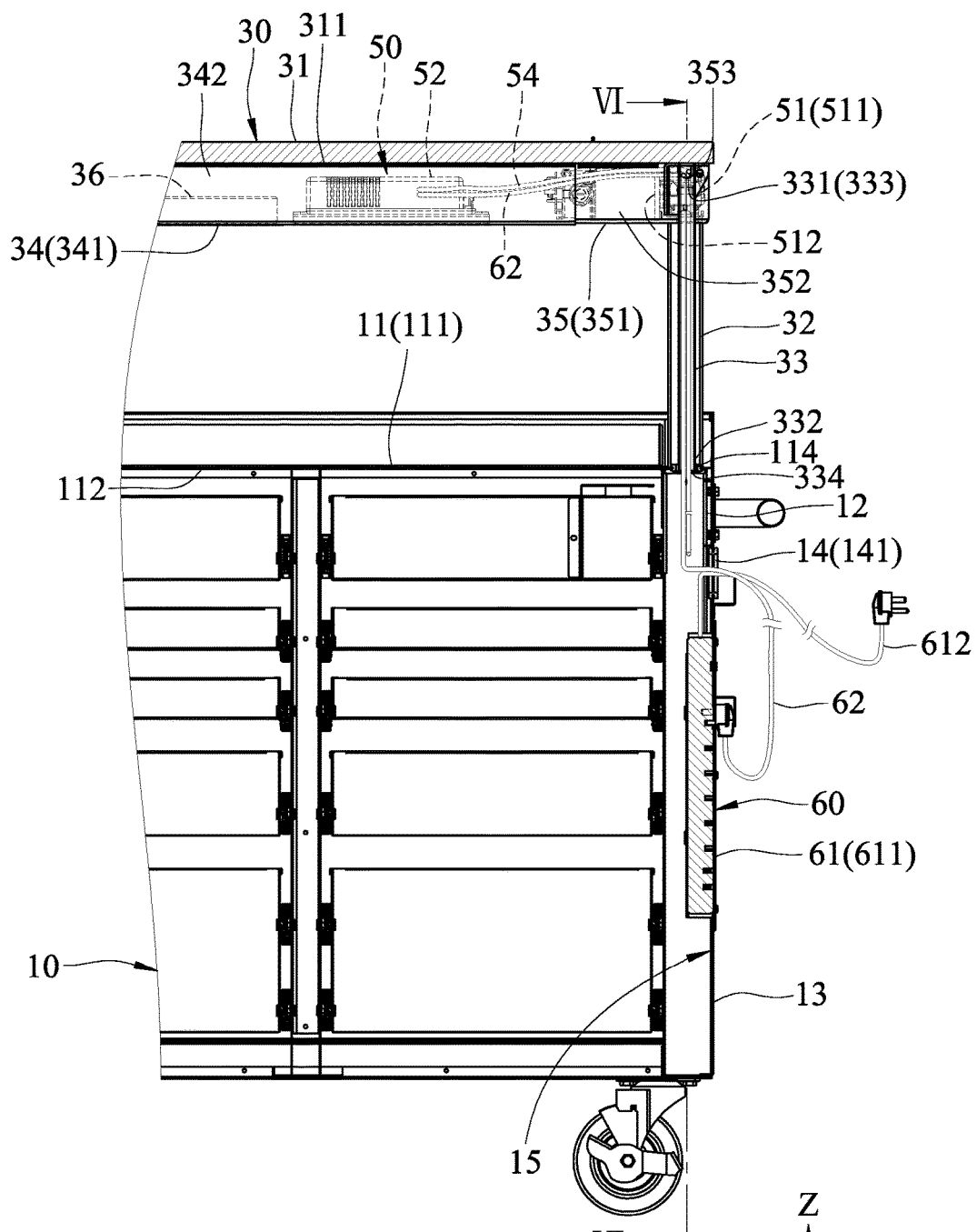
FIG. 5 is a fragmentary sectional view of the embodiment taken along line V-V in FIG. 4.

Referring to FIGS. 3 to 5, the cabinet body 10 includes a top wall 11, two spaced-apart guide rails 12, two side walls 13, and a grommet 14. The guide rails 12 are respectively disposed proximate to opposite ends of the top wall 11, and extend in a vertical direction (Z). The side walls 13 are spaced apart from each other in a horizontal direction (X), and are respectively disposed outside of the guide rails 12. The cabinet body 10 defines a routing space 15 that is proximate to one of the guide rails 12.

The top wall 11 has a wall top surface 111 and a wall bottom surface 112. The top wall 11 is formed with a guide hole 114 extending from the wall top surface 111 to the wall bottom surface 112, and is in communication with the routing space 15. The cabinet body 10 further defines a plurality of storage chambers 113 on the wall top surface 111 for containing tools (not shown).

In this embodiment, one of the side walls 13 which is proximate to the routing space 15 has a window opening 131 and a control opening 132. The grommet 14 is disposed on the one of the side walls 13, and has a grommet hole 141 communicating with the routing space 15.

The drawers 20 are movably disposed in the cabinet body 10, and are disposed under the top wall 11.

Figure 6:
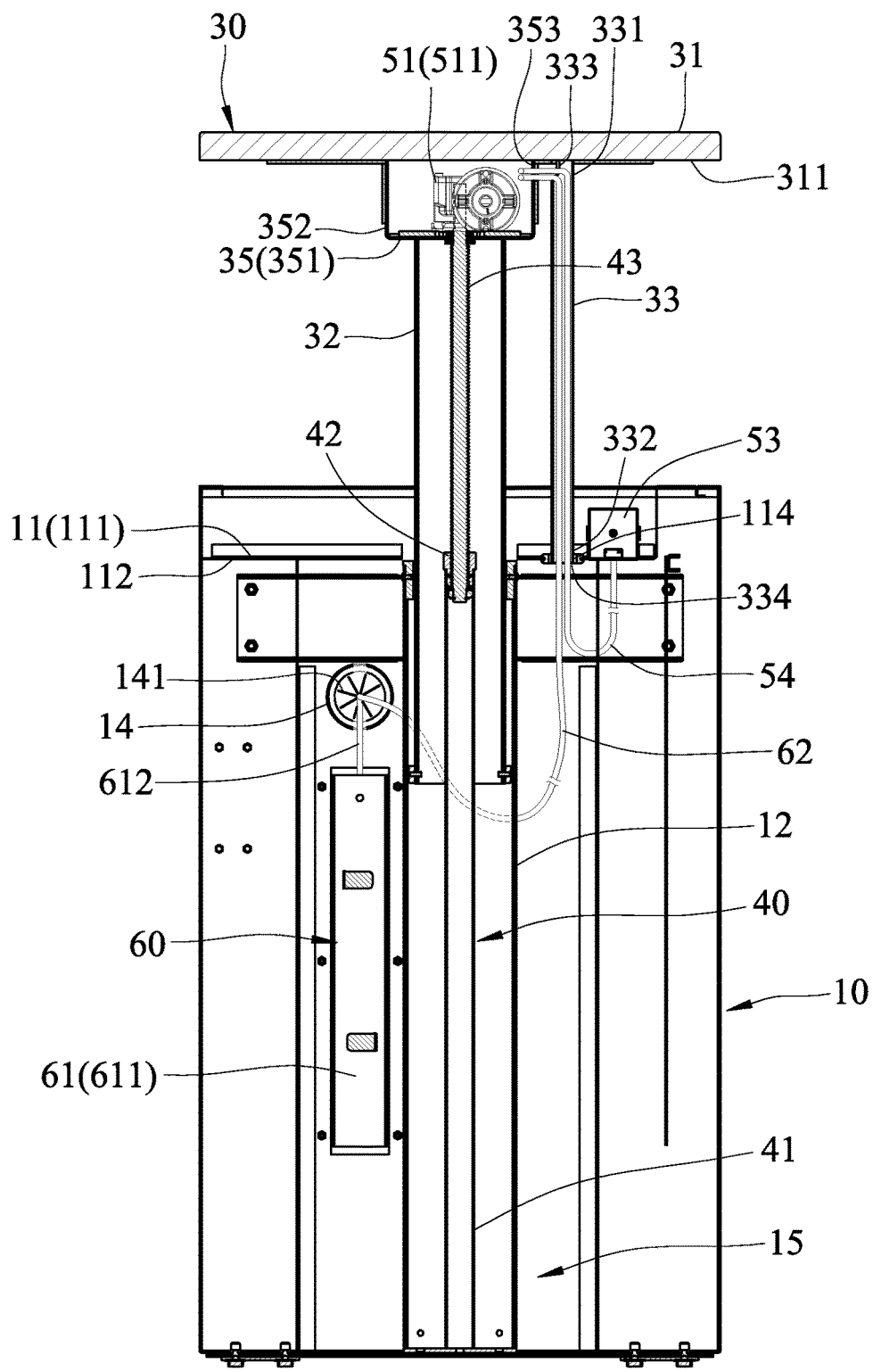
FIG. 6 is a sectional view of the embodiment taken along line VI-VI in FIG. 5, illustrating a working platform unit being at a lifted position, and a transmission wire of the embodiment extending through a protective tube of the working platform unit.

Referring to FIGS. 3, 5 and 6, the working platform unit 30 includes a platform member 31, two hollow extension members 32, a protective tube 33, a hollow cross beam 34, two motor cases 35, and a light case 36. The platform member 31 is disposed above the top wall 11, and has a bottom surface 311. The extension members 32 are respectively disposed on opposite ends of the platform member 31, and are connected respectively to the guide rails 12. Each of the extension members 32 is slidable relative to a respective one of the guide rails 12. The protective tube 33 extends downwardly from the platform member 31 in the vertical direction (Z) through the guide hole 114 of the top wall 11. The protective tube 33 has a top end portion 331 formed with a top opening 333, and a bottom end portion 332 formed with a bottom opening 334. The cross beam 34 is disposed on the bottom surface 311 of the platform member 31, and has opposite longitudinal ends in the horizontal direction (X). Each of the motor cases 35 is disposed on the bottom surface 311, and is connected between a respective one of the longitudinal ends of the cross beam 34 and a respective one of the extension members 32. The light case 36 is disposed in the cross beam 34 and is adapted for receiving a light device (not shown).

Figure 7:
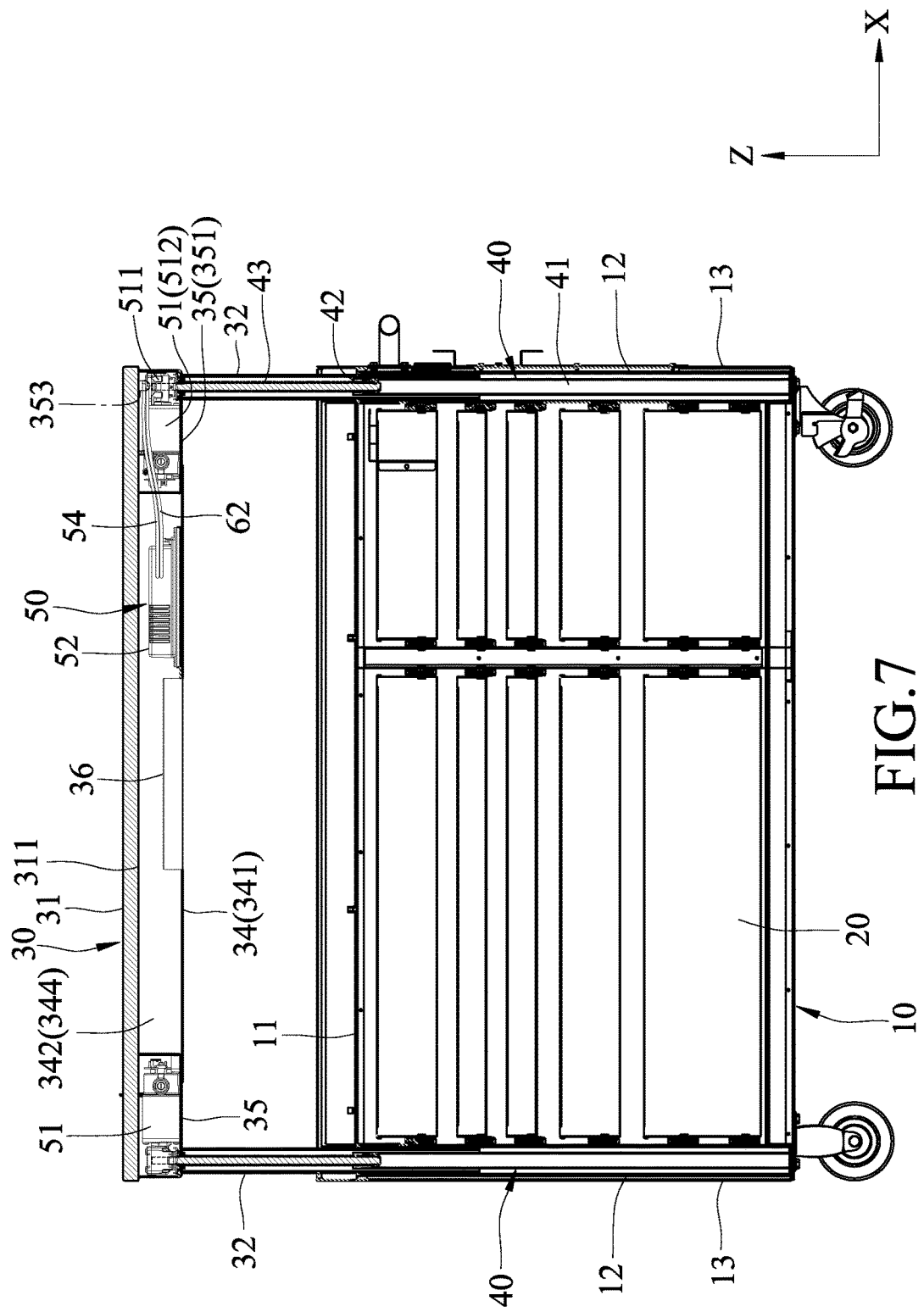
FIG. 7 is another sectional view of the embodiment taken along line VII-VII in FIG. 4, illustrating the working platform unit being at the lifted position.
Figure 8:
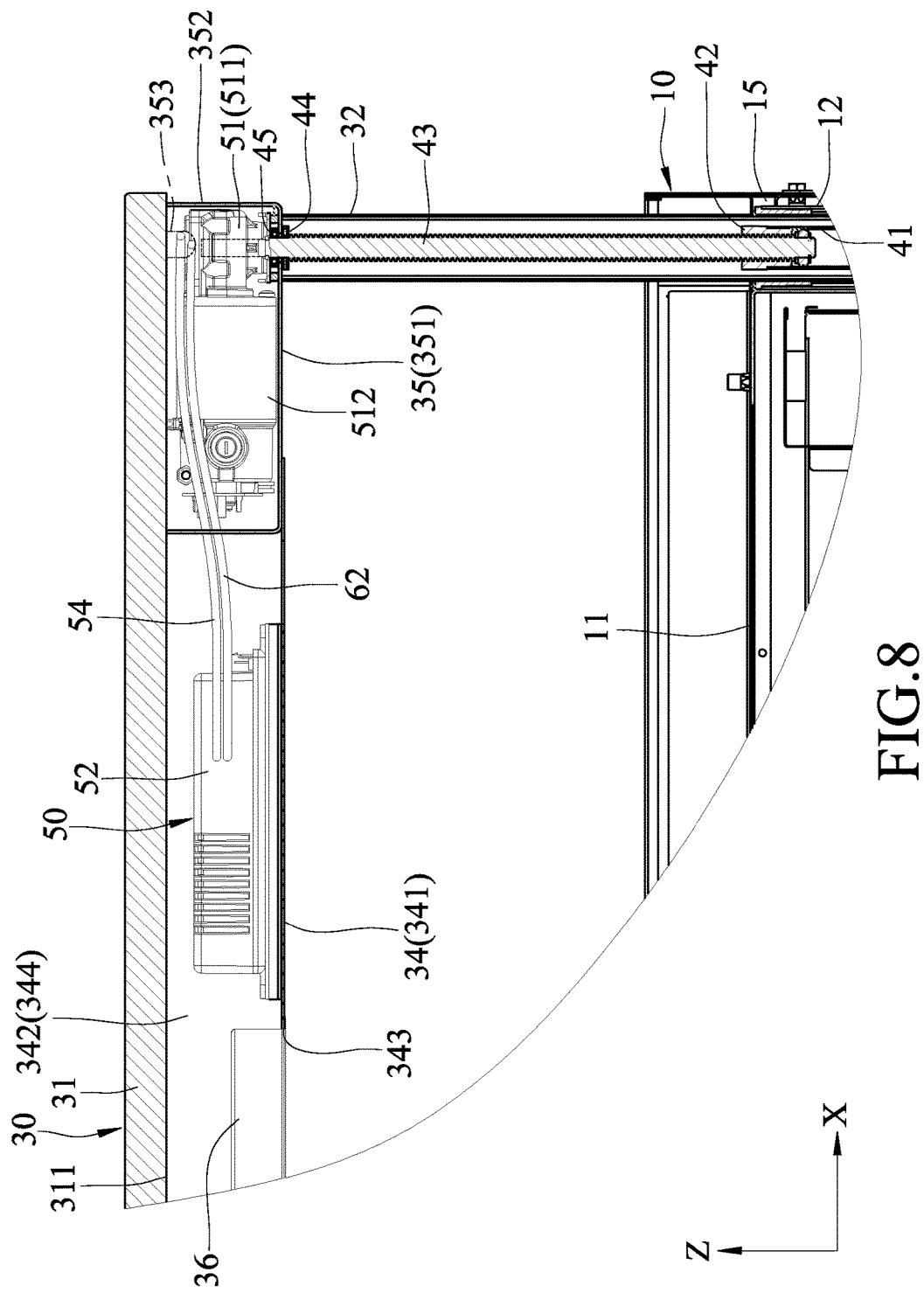
FIG. 8 is a fragmentary enlarged sectional view of FIG. 7.

Referring to FIGS. 6 to 8, the cross beam 34 has a beam bottom wall 341 having opposite edges that extend in the horizontal direction (X), and two connecting walls 342 respectively and upwardly extending from the opposite edges of the beam bottom wall 341, and cooperating with the beam bottom wall 341 to define a receiving space 344. The beam bottom wall 341 is formed with a through hole 343 (see FIG. 8) communicating with the receiving space 344.

Each of the motor cases 35 is in spatial communication with the receiving space 344, and has a case bottom wall 351 and a case surrounding wall 352 connected to the case bottom wall 351. In this embodiment, the case surrounding wall 351 of one of the motor cases 35 which is proximate to the protective tube 33 is formed with a wire opening 353 that communicates with the top opening 333. The light case 36 is received in the receiving space 344 and engages the through hole 343.

Figure 9:
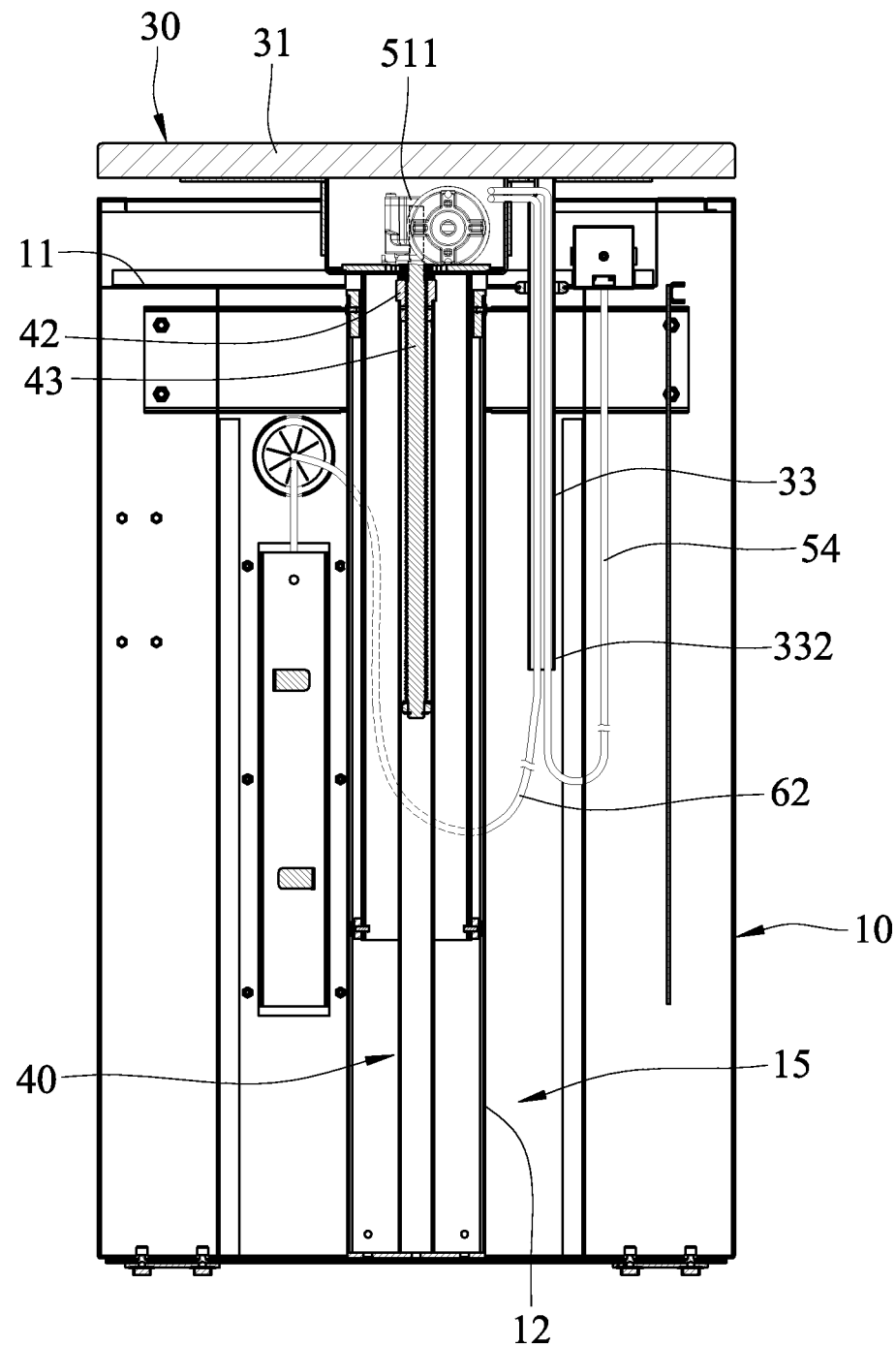
FIG. 9 is a view similar to FIG. 6, but illustrating the working platform unit being at a lowered position.
Figure 10:
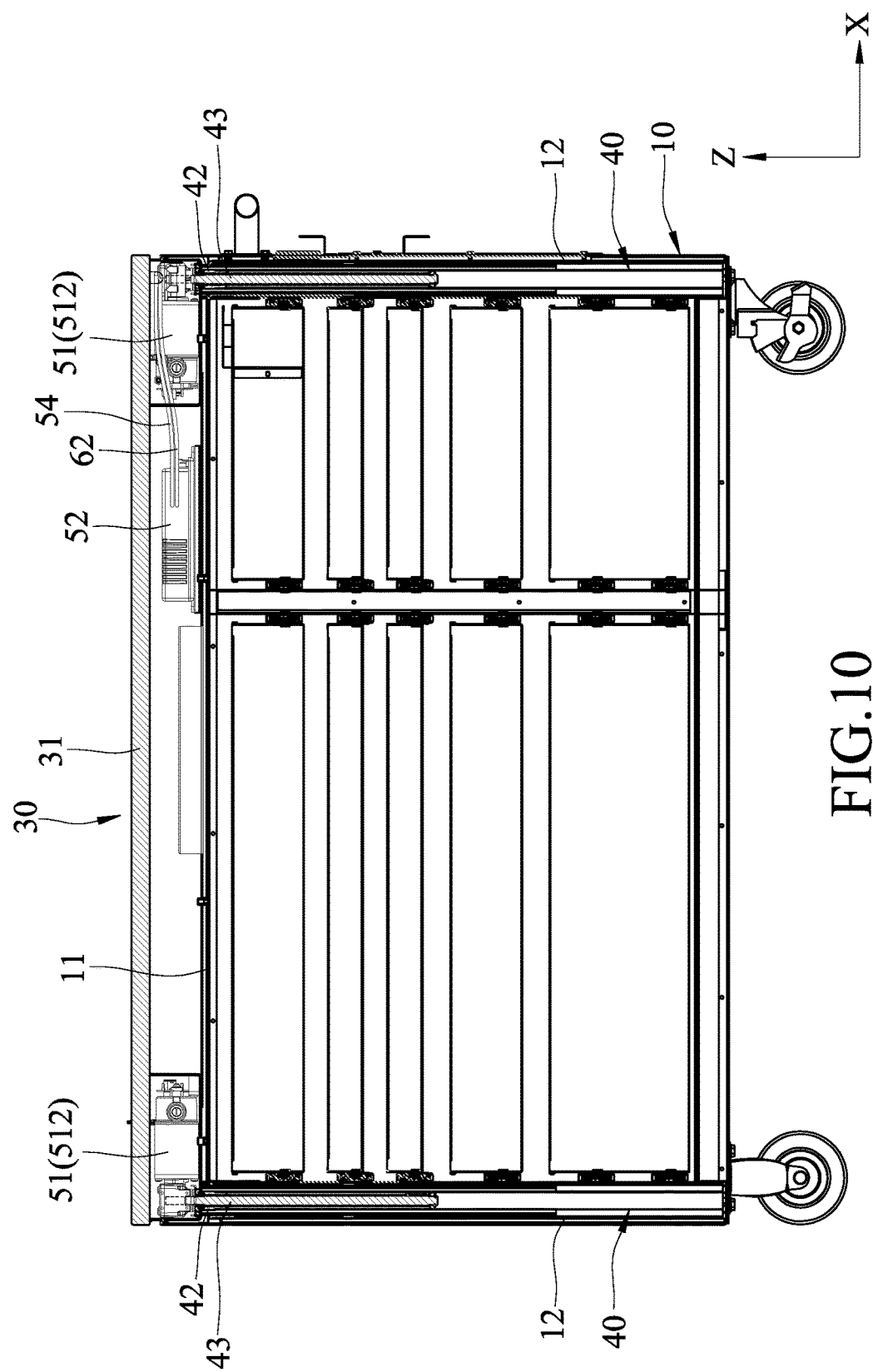
FIG. 10 is a view similar to FIG. 7, but illustrating the working platform unit being at the lowered position.

The working platform unit 30 is movable relative to the cabinet body 10 between a lowered position (see FIGS. 9 and 10), where the platform member 31 is proximate to the top wall 11 and where the bottom end portion 332 of the protective tube 33 is distal from the top wall 11, and a lifted position (see FIGS. 6 and 7), where the platform member 31 is distal from the top wall 11 and where the bottom end portion 332 of the protective tube 33 is proximate to the top wall 11 and disposed in the routing space 15.

Referring to FIGS. 3, 7 and 8, each of the lifting units 40 includes a guide tube 41 disposed on the cabinet body 10 and extending in a respective one of the guide rails 12, a nut 42 fixedly disposed on a top end of the guide tube 41, and a threaded rod 43 connected rotatably to the working platform unit 30, extending through a respective one of the extension members 32, and threadedly connected to the nut 42.

In this embodiment, the threaded rod 43 of each of the lifting units 40 extends rotatably through the case bottom wall 351 of a respective one of the motor cases 35. Each of the lifting units 40 (only one lifting unit 40 is shown in FIG. 8) further includes a thrust bearing 44 sleeved on the threaded rod 43 and connected to a bottom surface of the case bottom wall 351 of the respective one of the motor cases 35, and a ball bearing 45 sleeved on the threaded rod 43 and connected to a top surface of the case bottom wall 351 of the respective one of the motor cases 35.

The driving unit 50 is disposed on the working platform unit 30 for driving rotation of the threaded rod 43 of the respective one of the lifting units 40 relative to the nut 42 of the respective one of the lifting units 40, thereby driving the movement of the working platform unit 30 between the lowered and lifted positions.

In this embodiment, the driving unit 50 includes two driving modules 51, a control module 52, a lifting controller 53, and a signal wire 54 (see FIG. 4). The driving modules 51 are respectively disposed in the motor cases 35. Each of the driving modules 51 has a speed reduction mechanism 511 connected to the threaded rod 43 of a respective one of the lifting units 40, and a motor 512 disposed for driving the speed reduction mechanism 511 to rotate the threaded rod 43 of the respective one of the lifting units 40 relative to the nut 42 of the respective one of the lifting units 40. In this embodiment, the speed reduction mechanism 511 of each of the driving modules 51 is a speed reduction gearbox, but is not limited thereto in other embodiments.

The control module 52 is received in the receiving space 344 of the cross beam 34, and is electrically connected to the motors 512 of the driving modules 51 for synchronizing movements of the motors 512.

In this embodiment, referring to FIGS. 4 to 6, the lifting controller 53 is disposed on the top wall 11 of the cabinet body 10, is exposed from the control opening 132 of the one of the side walls 13, and has two buttons 531 for controlling the movement of the working platform unit 30. The signal wire 54 has an end electrically connected to the control module 52, and an opposite end extending via the wire opening 353 of the one of the motor cases 35 into the protective tube 33, and extending out of the bottom opening 334 of the protective tube 33 to electrically connect to the lifting controller 53.

The power supply unit 60 includes a power supply module 61 and a transmission wire 62. In this embodiment, the power supply module 61 is exemplified as a multiple socket, and has a socket body 611 that is disposed at an inner side of the one of the side walls 13 of the cabinet body 10 and that is exposed from the window opening 131, and a supply wire 612 that is connected electrically to the socket body 611, that extends outwardly of the one of the side walls 13 through the grommet hole 141 of the grommet 14, and that is adapted to be electrically connected to an external power source. The socket body 611 is formed with a plurality of socket holes 613 exposed from the window opening 131.

In this embodiment, the transmission wire 62 has an end electrically connected to the control module 52 of the driving unit 50, and an opposite end extending through the protective tube 33 into the routing space 15 of the cabinet body 10 and electrically connected to the power supply module 61. Specifically, the opposite end of the transmission wire 62 extends through the one of the motor cases 35 via the wire opening 353, extends into the protective tube 33 from the top opening 333 and out of the protective tube 33 through the bottom opening 334, extends out of the routing space 15 through the grommet hole 141 of the grommet 14, and is electrically connected to one of the socket holes 613 of the socket body 611.

In use, when lifting or lowering the working platform unit 30, a user needs to press one of the buttons 531 of the lifting controller 53 to transmit a control signal to the control module 52, so as to start the motors 512 of the driving modules 51 and synchronously drive movements of the threaded rods 43 of the lifting units 40 relative to the corresponding nuts 42. As a result, the working platform unit 30 can be smoothly moved along the guide rails 12 between the lowered position and the lifted position. It should be noted that in other embodiments, the control signal may be wirelessly transmitted from the lifting controller 53 to the control module 52 with the signal wire 54 being omitted.

In view of the above description, the advantages of the tool cabinet can be summarized in the following:

1. Since the signal wire 54 and the transmission wire 62 are shielded by and are co-movable with the protective tube 33 during the movement of the working platform unit 30, the user would not be distracted or entangled by the signal and transmission wires 54, 62, thereby ensuring a smooth movement of the working platform unit 30. In addition, the tool cabinet of the present disclosure would be tidy with the enclosure of the signal and transmission wires 54, 62.

2. By virtue of the synchronous movements of the motors 512 of the driving modules 51 driven by the control module 52, the threaded rods 43 of the lifting units 40 can move synchronously. In comparison with the aforementioned conventional tool cabinet, a delay in rotation of any one of the threaded rods 43 relative to the other one of the threaded rods 43 is effectively prevented, thereby ensuring a smooth movement of the working platform unit 30.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular future, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A tool cabinet comprising:
   a cabinet body including
      a top wall that is formed with a guide hole, and
      two spaced-apart guide rails respectively disposed proximate to opposite ends of said top wall and extending in a vertical direction, said cabinet body defining a routing space that is proximate to one of said guide rails, and that is in communication with said guide hole;
   a plurality of drawers movably disposed in said cabinet body, and disposed under said top wall;
   a working platform unit including
      a platform member that is disposed above said top wall,
      two hollow extension members that are respectively disposed on opposite ends of said platform member, and that are connected respectively to said guide rails, each of said extension members being slidable relative to a respective one of said guide rails, and
      a protective tube that extends downwardly from said platform member in the vertical direction through said guide hole, and that has a bottom end portion, said working platform unit being movable relative to said cabinet body between a lowered position, where said platform member is proximate to said top wall and where said bottom end portion of said protective tube is distal from said top wall, and a lifted position, where said platform member is distal from said top wall and where said bottom end portion of said protective tube is proximate to said top wall;
   two lifting units, each of which includes
      a guide tube that is disposed on said cabinet body and that extends in a respective one of said guide rails,
      a nut that is disposed fixedly on a top end of said guide tube, and
      a threaded rod that is connected rotatably to said working platform unit, that extends through a respective one of said extension members, and that is threadedly connected to said nut;
   a driving unit disposed on said working platform unit for driving rotation of said threaded rod of a respective one of said lifting units relative to said nut of the respective one of said lifting units, thereby driving the movement of said working platform unit between the lowered and lifted positions; and a power supply unit including
    a power supply module that is disposed on said cabinet body, and
    a transmission wire that has an end electrically connected to said driving unit, and an opposite end extending through said protective tube into said routing space and electrically connected to said power supply module.

2. The tool cabinet as claimed in claim 1, wherein:
said driving unit includes
    two driving modules, each of which has
        a speed reduction mechanism that is connected to said threaded rod of a respective one of said lifting units, and
        a motor that is disposed for driving said speed reduction mechanism to rotate said threaded rod of the respective one of said lifting units relative to said nut of the respective one of said lifting units, and
    a control module electrically connected to said motors of said driving modules for synchronizing movements of said motors; and
said end of said transmission wire is electrically connected to said control module of said driving unit.

3. The tool cabinet as claimed in claim 2, wherein:
said platform member has a bottom surface;
said working platform unit further includes
    a hollow cross beam disposed on said bottom surface, defining a receiving space, and having opposite longitudinal ends in a horizontal direction, and
    two motor cases disposed on said bottom surface, each of said motor cases being connected between a respective one of said longitudinal ends of said cross beam and a respective one of said extension members, and being in spatial communication with said receiving space;
said driving modules are respectively disposed in said motor cases;
said control module of said driving unit is received in said receiving space;
said bottom end portion of said protective tube is formed with a bottom opening;
said protective tube further has a top end portion formed with a top opening;
    one of said motor cases is formed with a wire opening communicating with said top opening; and
said opposite end of said transmission wire extends through said one of said motor cases via said wire opening, and extends into said protective tube from said top opening and out of said protective tube through said bottom opening.

4. The tool cabinet as claimed in claim 3, wherein:
said cabinet body further includes
    two side walls spaced apart from each other in the horizontal direction, and respectively disposed outside of said guide rails, and
    a grommet disposed on one of said side walls that is proximate to said routing space, and having a grommet hole that communicates with said routing space;
said one of said side walls has a window opening;
said power supply module has a socket body disposed at an inner side of said one of said side walls, and exposed from said window opening; and
said opposite end of said transmission wire extends out of said routing space through said grommet hole, and is electrically connected to said socket body.

5. The tool cabinet as claimed in claim 4, wherein:
said power supply module further has a supply wire connected electrically to said socket body, extending outwardly of said one of said side walls through said grommet hole, and adapted to be electrically connected to an external power source; and
said socket body is formed with a plurality of socket holes exposed from said window opening; and
said opposite end of said transmission wire is electrically connected to one of said socket holes.

6. The tool cabinet as claimed in claim 3, wherein said threaded rod of each of said lifting units extends rotatably into a respective one of said motor cases.

7. The tool cabinet as claimed in claim 6, wherein:
each of said motor cases has a case bottom wall;
said threaded rod of each of said lifting units extending rotatably through said case bottom wall of the respective one of said motor cases; and
each of said lifting units further includes
    a thrust bearing sleeved on said threaded rod and connected to a bottom surface of said case bottom wall of the respective one of said motor cases, and
    a ball bearing sleeved on said threaded rod and connected to a top surface of said case bottom wall of the respective one of said motor cases.

8. The tool cabinet as claimed in claim 3, wherein said cross beam has:
a beam bottom wall having opposite edges that extend in the horizontal direction; and
two connecting walls respectively and upwardly extending from said opposite edges of said beam bottom wall, and cooperating with said beam bottom wall to define said receiving space of said cross beam.

9. The tool cabinet as claimed in claim 8, wherein:
said beam bottom wall of said cross beam is formed with a through hole communicating with said receiving space; and
said working platform unit further includes a light case received in said receiving space and engaging said through hole.

10. The tool cabinet as claimed in claim 1, wherein said top wall of said cabinet body has a wall top surface, said cabinet body defining a plurality of storage chambers on said wall top surface.

* * * * *